United States Patent [19]

Ruhle

[11] 3,832,417
[45] Aug. 27, 1974

[54] DISPROPORTIONATION PROCESS
[75] Inventor: Helmut W. Ruhle, Edison, N.J.
[73] Assignee: Esso Research and Engineering Company, Linden, N.J.
[22] Filed: May 10, 1972
[21] Appl. No.: 252,128

Related U.S. Application Data
[62] Division of Ser. No. 886,766, Dec. 19, 1969, Pat. No. 3,668,146.

[52] U.S. Cl. ..... 260/683 D, 260/654 R, 260/666 A, 260/668 R, 260/677 R, 260/680 R
[51] Int. Cl. ............................................. C07c 3/62
[58] Field of Search ........ 260/677 R, 683 D, 680 R, 260/666 A

[56] References Cited
UNITED STATES PATENTS

| | | | |
|---|---|---|---|
| 3,437,649 | 4/1969 | Mueller | 252/431 |
| 3,463,827 | 8/1969 | Banks | 260/683 |
| 3,535,401 | 10/1970 | Calderon et al. | 260/683 |
| 3,558,518 | 1/1971 | Zuech | 260/683 |
| 3,567,731 | 3/1971 | Kubicek et al. | 252/431 |

Primary Examiner—Delbert E. Gantz
Assistant Examiner—C. E. Spresser
Attorney, Agent, or Firm—Robert J. Baran

[57] ABSTRACT

An improved process for the disproportionation of olefins results by contacting said olefins in the presence of a catalyst prepared by reacting a Group VIB metal carbonyl complex having the general formula $L_aM_b(CO)_c$ wherein L is selected from the group consisting of CO, $R_3Q$, $R_3QO$, $(RO)_3Q$, $RNH_2$, $R_2NH$, RCN, $R_2SO$, $R_2N$—CN, $R_3P$=N—CN, $R_3P$=NH, $R_3P$=CH—CH$_3$, $R_2Q$—QR$_2$, $R_2Q$—R$^2$—QR$_2$, $R_2Q$—R$^2$—QR—R$^2$—QR$_2$, R—Z—R$^2$—Z—R, R—Z—R$^2$—Z—R$^2$—Z—R

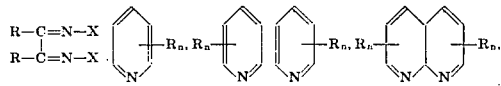
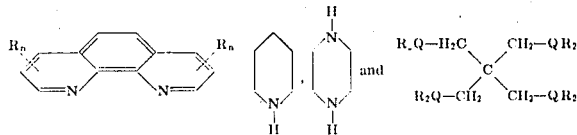

wherein Q is selected from the group consisting of N, P, As and Sb; Z is selected from the group consisting of O and S; X is selected from the group consisting of NR$_2$, OH, OR and R; R is selected from the group consisting of $C_1$ to $C_{20}$ hydrocarbyl and hydrogen radicals; and R$^2$ is selected from the group consisting of divalent $C_1$ to $C_{20}$ hydrocarbyl radicals; n is an integer of from 0 to 2; M is a Group VI-B metal selected from the group consisting of Cr, Mo and W; a may vary from 1 to 4; b may vary from 1 to 2; and c may vary from 2 to 10, with an ionic compound, said ionic compound being selected from the group consisting of compounds having the general formula $R'_4Q'X'$, $R'_3ZX'$, $(R'_4Q')(AlR'_dX'_{4-d})$, $(R'_3Z)(AlR'_dX'_{4-d})$, mixtures of $R'_4Q'X'$ or $R'_3ZX'$ with $AlR'_dX'_{3-d}$ and mixtures thereof wherein R' is selected from the group consisting of $C_1$ to $C_{20}$ hydrocarbyl radicals and halogenated derivatives thereof, Q' is selected from the group consisting of nitrogen, phosphorous and arsenic, Z is selected from the group consisting of oxygen and sulfur, X' is halogen and d may vary from 0 to 3, and said ionic compound being at least partially soluble in said solvent and an activator, said activator comprising an organometallic derivative selected from the group consisting of compounds having the general formula $R''_eAlX'_{(3-e)}$, a mixture of the above compound with a compound having the general formula $AlX'_3$, a compound of the general formula $R''_fM'X'_g$, a mixture of one of several compounds having a formula $R''_fM'X'_g$ with one of the various compounds having the formula $R''_eAlX'_{(3-e)}$ and $AlX'_3$ wherein R'' is selected from the group consisting of $C_1$—$C_{20}$ hydrocarbyl radicals and the alkoxy and halo derivatives thereof, M' is a metal selected from Groups I through III of the Periodic Table of Elements, X' is halogen, e is equal to 1 or 2, f is an integer between 1 and 3, and g is 0, 1 or 2, the atomic ratios of the metal in said activator to the metal in said metallic complex being from about 20:1 to 1:1, the molar ratio of Cr, Mo or W of said metallic complex to ionic compound being from about 10:1 to 0.1:1, and the molar ratio of said Group I-III metal of said activator to ionic compound being from about 40:1 to 1.5:1.

15 Claims, No Drawings

DISPROPORTIONATION PROCESS

This is a division of application Ser. No. 886,766, filed Dec. 19, 1969, now U.S. Pat. No. 3,668,146.

BACKGROUND OF THE INVENTION

This invention relates to a novel process for producing a unique catalyst, said catalyst being especially effective for the disproportionation of olefins.

The disproportionation of olefins refers to those reactions in which one or more olefinic compounds are transformed into other olefins usually having different molecular weights. The reaction can be regarded as consisting of the breaking of the double bonds of the reacting olefins and the recombination of the resulting fragments in such a manner that new olefinic products will result.

In the past a variety of catalysts had been known for this purpose. Typical of such catalysts is a catalyst comprising a VIB metal complex represented by the formula $[(L)_a M_b Z_c]_x$ wherein each (L) is a CO, $R_3Q$, $R_3QO$, $P_2Q$-$QR_2$ or $R^2(COO)_m$ ligand, each Z is a halogen or CN, SCN, OCN, $SaCl_3$ radical; M is Mo, W, MoO, $MoO_2$, WO, $WO_2$ preferably Mo or W; Q is phosphorous, arsenic, or antimony; $a$ is 1-6, $b$ is 1-2, generally 1, $c$ is 0-5, and the number of (L) and Z groups present in the complex is not greater than the number required for the metal to achieve the closed snell electronic configuration of the next higher atomic number inert gas; $x$ is a number, generally 1, representing the polymeric state of the complex; R is an aromatic or saturated aliphatic hydrocarbon radical, including alkoxy and halo derivatives thereof, having up to 20 carbon atoms; $m$ is 1 or 2; $R^2$ is an aromatic, saturated aliphatic, or ethylenically unsaturated hydrocarbon radical having up to 30 carbon atoms, $R^2$ being monovalent when $m$ is 1 and divalent when $m$ is 2; with an organometallic reducing agent.

Variations on the above catalyst are also known in which Group VII metals are utilized as well as Group VIII metals. Although these catalysts have proven to be somewhat successful in the disproportionation of olefins their acceptance has been hindered somewhat by the great expense associated with their production. In addition, many of these catalysts have not shown great activity particularly at lower temperatures, i.e., temperatures in the range of $-25°$ to $40°C$.

Heterogeneous catalysts which have been utilized for olefin disproportionation in the past have had only limited success as indicated by their relatively low activities and selectivities and the requirement that the reactions must be carried out in the vapor state.

SUMMARY OF THE INVENTION

According to this invention, it has unexpectedly been found that Group VI-B metal carbonyl complexes of the general formula $L_a M_b (CO)_c$, when contacted within a solution with two other elements, an ionic halide which is at least partially soluble in the reaction mixture and an organometallic derivative, preferably a halide, form a unique catalyst which is especially effective for olefin disproportionation. In the carbonyl complex L is a ligand, M is a Group VI-B metal, $a$ may vary from 1 to 4, $b$ may vary from 1 to 2, and $c$ may vary from 2 to 10. The final component is an organometallic derivative which serves as an activator for the catalyst. The metallic element of the organometallic derivative is selected from Groups I through III of the Periodic Table and more preferably is selected from Groups I-A, II-A, II-B or III-A of the Periodic Table.

The contacting between (a) the Group VI-B metal carbonyl, (b) the ionic halid, and (c) the organometallic derivative may take place at temperatures which range from below ambient to elevated, and pressures which would vary from subatmospheric to superatmospheric. In a preferred embodiment, the catalyst is formed at ambient conditions. The contacting must take place in a solvent, preferably an inert solvent; the reacting olefin may serve as a solvent in the event that the catalyst is to be utilized for olefin disproportionation.

In more detail, the instant invention pertains to a novel catalyst, means for preparing said catalyst, and the use of said catalyst in the disproportionation of olefins.

To produce the homogeneous catalyst of the instant invention, one must combine three components. The first component is a Group VI-B metal carbonyl complex which has the formula $L_a M_b (CO)_c$. In the above formula L is a mono- or polydentate ligand; M is chromium, molybdenum or tungsten, preferably molybdenum; $a$ may vary from 1 to 4; $b$ from 1 to 2; and $c$ from 2 to 10. Typical examples of compounds suitable as ligand L are the following: CO, $R_3Q$, $R_3QO$, $(RO)_3Q$, $RNH_2$, $R_2NH$, RCN, $R_2SO$, $R_2N$—CN, $R_3P$=N-CN, $R_3P$=NH, $R_3P$=CH-$CH_3$, $R_2Q$—$QR_2$, $R_2Q$—$R^2$—$QR_2$, $R_2Q$—$R^2$—QR—$R^2$—$QR_2$, R—Z—$R^2$—Z—R, R—Z—$R^2$—Z—$R^2$—Z—R

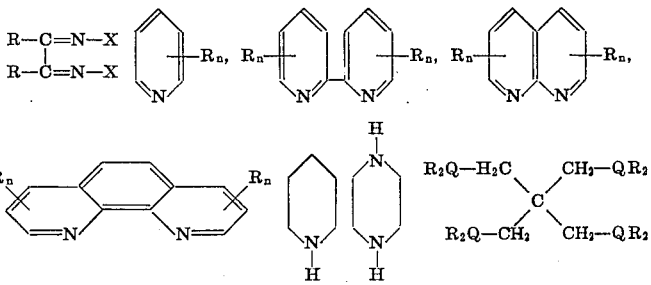

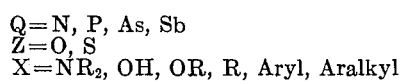

Q=N, P, As, Sb
Z=O, S
X=$NR_2$, OH, OR, R, Aryl, Aralkyl

R equals alkyl, alkenyl, alicyclic, aryl, aralkyl, alkaryl or hydrogen, preferably $C_1$ through $C_{20}$ alkyl, $C_2$ through $C_{20}$ alkenyl, $C_3$ through $C_{20}$ cycloalkyl or cycloalkenyl, $C_6$ through $C_{20}$ aryl and $C_7$ through $C_{20}$ aryl and $C_7$ through $C_{20}$ aralkyl and alkaryl.

$R_2$ equals divalent alkyl, alkenyl, alicyclic, aryl, aralkyl or alkenyl, preferably $C_1$ through $C_{20}$ alkyl, $C_2$ to $C_{20}$ alkenyl, $C_3$ through $C_{20}$ cycloalkyl or cycloalkenyl, $C_6$ through $C_{20}$ aryl and $C_7$ through $C_{20}$ aralkyl and aralkenyl Preferred ligands which may be utilized are as follows: CO, $NH_3$, hydrazine, phenylhydrazine, cyclohexylamine, n-butylamine, dimethylamine, aniline, diethylamine, pyridine, 2,6-dimethylpyridine, triphenylarsine, tributylstibine, triphenylstibine, dimethylsulfoxide, dimethylcyanamide, N-cyano-piperidine, triphenylphosphine imine, ethylenediamine, tetramethylethylenediamine, 2,2'-dipyridyl, 1,10-phenanthroline, 2,7-dimethyl-1,8-naphthyridine, diacetyl dihydrazone, dibenzoyl dihydrazone, diacetyl dianil, piperidine, piperazine, acetonitrile, pripionitrile, acrylonitrile, triphenylphosphine, triphenylphosphine oxide, triphenyl phosphite, tricyclohexylphosphine, triphenylarsine, tri(p-tolyl)arsine, diacetyl dioxime, diacetyl dioxime dimethyl ether, diacetyl bis(phenylhydrazone) dimethoxyethane, 3,6-dithiaoctane, tetramethyldiphosphine, 1,2-bis(diphenylphosphino)ethane, 1,2-bis(diphenylarsino)ethane, O-phenylene bis(dimethylarsine), diethylenetriamine, bis(2-methoxyethyl) ether, 2,5,8-trithianonane, tris(diphenylphosphinomethyl) ethane, tetrakis(diphenylphosphinomethyl)methane, etc.

Specific examples of the metallic carbonyl complex $L_aM_b(CO)_c$ are as follows: $Cr(CO)_6$, $Mo(CO)_6$, $W(CO)_6$, $NH_3Mo(CO)_5$, cyclohexylamine $Mo(CO)_5$, hydrazine $Mo(CO)_5$, ethylenediamine $Mo(CO)_5$, acetonitrile $Mo(CO)_5$, pyridine $Mo(CO)_5$, piperazine $Mo_2(CO)_{10}$, piperidine $Mo(CO)_5$, tetramethyldiphosphine $Mo_2(CO)_{10}$, triphenylphosphine $Mo(CO)_5$, triphenylphosphine oxide $Mo(CO)_5$, dimethyl cyanamide $Mo(CO)_5$, (pyridine)$_2Mo(CO)_4$, (acetonitrile)$_2Mo(CO)_4$, (triphenylphosphine)$_2$ $Mo(CO)_4$, (triphenylphosphine oxide)$_2Mo(CO)_4$, ethylenediamine $Mo(CO)_4$, 2,2'-dipyridyl $Mo(CO)_4$, diacetyl dihydroazone $Mo(CO)_4$, dibenzoyl dihydrazone $Mo(CO)_4$, diacetyl dianil $Mo(CO)_4$, 1,10-phenanthroline $Mo(CO)_4$, 1,2-dimethoxyethane $Mo(CO)_4$, (pyridine)$_3Mo(CO)_3$, (acetonitrile)$_3Mo(CO)_3$, (aniline)$_3Mo(CO)_3$, (triphenylphosphine)$_3Mo(CO)_3$, (dimethylsulfoxide)$_3$-$Mo(CO)_3$, (ethylenediamine)$_2Mo(CO)_3$, (ethylenediamine)$_3Mo_2(CO)_6$, diethylenetriamine $Mo(CO)_3$, diglyme $Mo(CO)_3$, 3,6,9-trithiaundecane $Mo(CO)_3$, (2,2'-dipyridyl)$_2Mo(CO)_2$, (1,10-phenanthroline)$_2Mo(CO)_2$, (acetonitrile)$_2$(triphenylphosphine)$_2Mo(CO)_2$, (pyridine)$_2$ (triphenylphosphine)$_2Mo(CO)_2$.

The second component in the total catalyst system is an ionic compound, preferably an ionic halide that is at least partially soluble in the reaction mixture under reaction conditions, and is selected from the group consisting of compounds having the general formula $R'_4Q'X'$, $R'_3ZX'$, $(R'_4Q')(AlR'_dX'_{4-d})$, $(R'_3Z)(AlR'_dX'_{4-d})$, mixtures of $R'_4Q'X'$ or $R'_3ZX'$ with $AlR'_dX'_{3-d}$ compounds or mixtures of any of the above compounds wherein $R'$ is a $C_1-C_{20}$ hydrocarbyl radical preferably an aryl or aliphatic radical selected from the group consisting of $C_6$ through $C_{20}$ aryl radicals, $C_1$ through $C_{20}$ alkyl radicals, $C_3$ through $C_{20}$ cycloalkyl radicals, $C_2$ through $C_{20}$ alkenyl radicals, $C_3$ through $C_{20}$ cycloalkenyl radicals and halogenated derivatives thereof. $Q'$ is nitrogen, phosphorus or arsenic, Z is oxygen or sulfur; and $Q'$ and Z may also be incorporated into a saturated, unsaturated or aromatic ring system, e.g., as in pyridinium salts; $X'$ is halogen, preferably chlorine; and $d$ may vary from 0 to 3. Specific examples of the second component which are preferred are as follows:
tetra-n-butylammonium chloride, tetra-n-propylammonium chloride, tetra-n-butylammonium bromide, tri-n-propylphenylammonium chloride, N-dihexylpiperidinium chloride, N-octylpyridinium chloride, N-dibutylcyclohexylammonium chloride, tetra-n-butylphosphonium chloride, tetraphenylphosphonium chloride, tetraphenylarsonium chloride, tri-n-butyloxonium chloride, tetra-n-butylammonium methyltrichloroaluminate, tetra-n-butylammonium dimethyldichloroaluminate, tetra-n-propylammonium diethyldichloroaluminate, tri-n-butyloxonium dimethyldichloroaluminate and mixtures thereof.

The third component is an activating agent and it may be selected from many different activating agents including compounds of the general formula $R''_eAlX'_{(3-e)}$, a mixture of the above compound with a compound having the general formula $AlX'_3$, a compound of the general formula $R''_fM'X'_g$, a mixture of one of several compounds having a formula $R''_fM'X'_g$ with one of the various compounds having the formula $R''_eAlX'_{(3-e)}$ and/or $AlX'_3$ wherein $R''$ is a $C_1-C_{20}$ hydrocarbyl radical preferably selected from the group consisting of $C_6-C_{20}$ aromatics, $C_1-C_{20}$ alkyl, $C_2-C_{20}$ alkenyl, $C_3-C_{20}$ cycloalkenyl, $C_3-C_{20}$ cycloalkyl radicals, most preferably $C_1-C_6$ alkyl, $C_2-C_6$ alkenyl, $C_6-C_{10}$ aryl, $C_3-C_{10}$ cycloalkyl and cycloalkenyl. The alkoxy and halo derivatives thereof may also be utilized. $M'$ is a metal selected from Groups I through III of the Periodic Table of Elements as published in "The Handbook of Chemistry and Physics," Chemical Rubber Company, 47th Edition (1966), preferably Groups I-A, II-A, II-B or III-A; $X'$ is halogen, preferably chlorine; $e$ is equal to 1 or 2; $f$ is an integer between 1 and 3; and $g$ is 0, 1 or 2. Typical examples of preferred compounds having the formula $R''_eAlX'_{(3-e)}$ and $AlX'_3$ are methylaluminum dichloride, dimethylaluminum chloride, methylaluminum sesquichloride, ethylaluminum dichloride, ethylaluminum sesquichloride, aluminum trichloride, aluminum tribromide, methylaluminum sesquibromide, phenylaluminum dichloride, 3-ethoxypropylaluminum dichloride and eicosylaluminum sesquichloride.

Examples of the compounds having the general formula $R''_fM'X'_g$ are as follows: methylsodium, phenyllithium, n-butyllithium, diethylzinc, diethylmagnesium, ethylmagnesium bromide, triethylaluminum, triisobutylaluminum, triphenylaluminum methyl cadmium chloride, dicyclohexylmercury, triethylindium, triisopropylthallium, dimethylcalcium, phenylmercurychloride, diisopropylboron chloride and phenylboron dichloride.

None of the three individual components of the instant catalyst would individually show catalytic activity for the disproportionation of olefins. A mixture of the second and third component is catalytically inactive, too. A mixture of the first and third components, the metallic carbonyl and the activating agent, may in some cases show catalytic activity which is, however, very low and a considerable amount of isomerization will frequently be observed. It is thus found that component 2, the ionic compound, is an essential part of the catalytic system when high yields of olefinic disproportionation products and low amounts of isomerization products are desired.

In combining the various components of the catalytic system, atomic ratios of Group I, II or III metal in the activator to the chromium, molybdenum or tungsten of the Group VI-B carbonyl compound should be between 20:1 and 1:1, preferably between 10:1 and 4:1. The molar ratio of chromium, molybdenum or tungsten to the ionic compound, should be between 10:1 and 0.1:1, preferably between 5:1 and 0.5:1. Molar ratios of Group I–III metal of the third component to the second component should be between 40:1 and 1.5:1, preferably between 20:1 and 4:1.

Any order of addition of components is permissible. The components are usually combined at temperatures which allow the formation of an active catalyst species. The temperature may range between about −35°C. and 100°C., preferably between 0°C. and 80°C. Pressures will vary between 0.1 atm. and 1000 atm. preferably 1 atm. and 100 atm. The three components usually react immediately; in some cases a short induction period of a few seconds to 1 minute is necessary.

The reaction proceeds most effectively within a solvent, the reacting olefin itself may act as a solvent; the solvent should be inert in nature and is preferably organic. Typical solvents which may be utilized are $C_1$–$C_{15}$ alkanes, $C_6$–$C_{20}$ aromatics, $C_1$–$C_{10}$ haloalkanes, $C_6$–$C_{15}$ haloaromatics and haloalkenes which have a halogen substituted on the double bond. Examples of solvents which may be used are pentane, hexane, decane, benzene, xylene, carbontetrachloride, dichloromethane, chlorobenzene, bromobenzene, tetrachloroethylene and trichloroethylene.

Following the formation of the catalyst, suitable olefins may be added directly in order to commence the disproportionation reaction. The catalyst may, in fact, be generated in the presence of the reacting olefins.

The catalyst may also be deposited on an inert solid support such as silica or alumina.

The basic formula for the homo disproportionation of an olefin is as follows:

$$A/2\ R_1(R_2)C=CR_3(R_4) \rightleftarrows B/R_1(R_2)C=CR_1(R_2) + C/R_3(R_4)C=CR_3(R_4)$$

In the above reaction $R_1$, $R_2$, $R_3$ and $R_4$ may be selected from the group consisting of $C_1$ to $C_{40}$ alkyl, aryl, alkenyl, alkaryl, aralkyl, cycloalkyl, cycloalkenyl or hydrogen; at least one of the group consisting of $R_1$, $R_2$, $R_3$, and $R_4$ is an aryl radical or an R′—$CH_2$ radical wherein R′ is an alkyl, aryl, alkenyl, alkaryl, aralkyl, cycloalkyl or cycloalkenyl radical or a hydrogen atom. Additionally, halogenated derivatives of any of the preceding compounds may also be utilized provided that the halogen is more than two carbon atoms removed from the double bond.

More particularly, $R_1$, $R_2$, $R_3$ and $R_4$ may be selected from the group consisting of $C_1$ to $C_{40}$ alkyl, $C_6$ to $C_{20}$ aryl including those aryls in which two aromatic rings are condensed, $C_2$ to $C_{40}$ alkenyl but not conjugated dienes $C_7$ to $C_{20}$ alkaryls, $C_7$ to $C_{40}$ aralkyl, $C_3$ to $C_{20}$ cycloalkyl, $C_3$ to $C_{20}$ cycloalkenyl radicals provided that there are no conjugated double bonds within the cycloalkenyl radical or a hydrogen atom. Again, halogenated derivatives, preferably chlorine, of the previously mentioned radicals may be utilized providing the chlorine or halogen utilized is more than two carbons removed from the double bond.

As previously mentioned, at least one of the said $R_1$, $R_2$, $R_3$ and $R_4$ must be an aryl radical or an R′—$CH_2$ radical wherein R′ is a $C_1$ to $C_{40}$ alkyl, a $C_6$ to $C_{20}$ aryl, a $C_2$ to $C_{40}$ alkenyl, $C_7$ to $C_{20}$ alkaryl, a $C_7$ to $C_{40}$ aralkyl, a $C_3$ to $C_{20}$ cycloalkyl or a $C_3$ to $C_{20}$ cycloalkenyl or a hydrogen atom. The most preferred values for $R_1$, $R_2$, $R_3$, and $R_4$ are $C_1$ to $C_{20}$ alkyls, $C_6$ to $C_{20}$ aryls and $C_2$ to $C_{20}$ alkenyls and hydrogen provided that at least one of said $R_1$, $R_2$, $R_3$, and $R_4$ is an aryl radical or an R′$CH_2$ radical and R′ is a $C_1$ to $C_{20}$ alkyl, $C_6$ to $C_{20}$ aryl, and $C_2$ to $C_{20}$ alkenyl and hydrogen. Additionally, the catalyst of the instant invention is useful for cross disproportionation; by cross disproportionation it is meant those reactions in which a mixture of two different olefins is reacted to form at least one olefinic product. At least one of the products obtained is different of either of the reactants. The general concept of cross disproportionation is illustrated by the following formula:

$$R_1(R_2)C=C(R_3)R_4 + R_5(R_6)C=C(R_7)R_8 \rightleftarrows$$
$$R_1(R_2)C=C(R_7)R_8 + R_1(R_2)C=C(R_6)R_5 +$$
$$R_4(R_3)C=C(R_7)R_8 + R_4(R_3)C=C(R_6)R_5$$

Indicative of the homo disproportionation reaction and the products produced is the following Table.

TABLE

| Reactant A | B | Products C |
|---|---|---|
| 2 $R_1(R_2)C=CR_3(R_4)$ | $R_1(R_2)C=CR_1(R_2)$ | $+R_3(R_4)C=CR_3(R_4)$ |
| $CH_3CH_2CH_2CH=CH_2$ | $CH_3CH_2CH_2CH=CHCH_2CH_2CH_3$ | $+CH_2=CH_2$ |
| $CH_3CH_2CH=CHCH_3$ | $CH_3CH_2CH=CHCH_2CH_3$ | $+CH_3CH=CHCH_3$ |
| $CH_3(CH_2)_{17}CH=CH$ | $CH_3(CH_2)_{17}CH=CH(CH_2)_{17}CH_3$ | $+CH_2=CH_2$ |
| $C_6H_5CH_2CH_2CH=CH_2$ | $C_6H_5CH_2CH=CHCH_2CH_2C_6H_5$ | $+CH_2=CH_2$ |
| $ClCH_2CH_2CH_2CH_2CH=CH_2$ | $ClCH_2CH_2CH_2CH_2CH=CHCH_2CH_2—CH_2CH_2Cl$ | $+CH_2=CH_2$ |
| —$CH_2CH=CH_2$ | 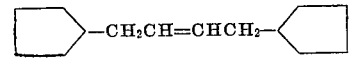—$CH_2CH=CHCH_2$— | $+CH_2=CH_2$ |
| $CH_3CH_2\overset{CH_3}{\underset{|}{C}}=CHCH_2CH_2CH_3$ | $CH_2CH_2(CH_3)C=C(CH_3)CH_2CH_3$ | $+CH_3CH_2CH_2CH=CH$ $CH_2CH_2CH_3$ |
| $CH_2=CHCH_2CH=CH_2$ | $CH_2=CHCH_2CH=CHCH_2CH=CH_2$ | $+CH_2=CH_2$ |
| —$CH=CH_2$ | 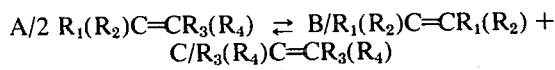 | $+CH_2=CH_2$ |

Other disproportionation reactions of the instant invention include the following:

The transformation of a mixture of an acyclic mono- or polyolefin and a cyclic mono or polyolefin in such a way as to form a new acyclic polyolefin of higher molecular weight than the starting materials. A general equation for such a reaction would be

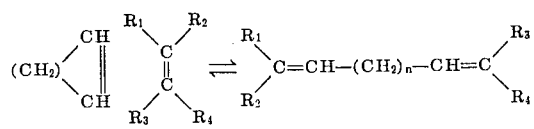

In this case $n$ is an integer varying from 2 to 30. The reverse of this reaction may also be carried out; thus one may employ an acyclic polyolefin as a starting material and can obtain a cyclic mono or polyolefin and an acyclic mono or polyolefin of lesser molecular weight than the starting material as products.

The transformation of one or more cyclic mono- or polyolefins in such a manner that a new cyclic polyene of higher molecular weight is produced. A general equation for such a reaction would be

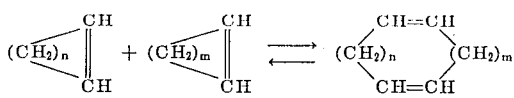

In this case n and m are integers which may vary from 2 to 30 and they may either be the same or different. It is understood that in this reaction the products may react further in a similar manner to form materials of higher molecular weight.

The transformation of one or more acyclic polyolefins so as to form cyclic mono- or polyolefins and acyclic mono- or polyolefins. A general equation for such a reaction would be:

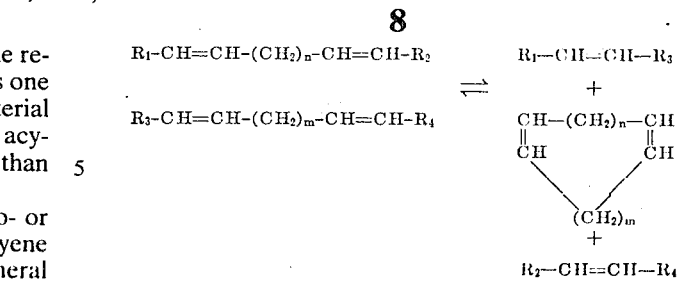

In this case $n$ and $m$ are integers and may vary from 1 to 20 and may be either the same or different from each other.

In the above equations $R_1$ through $R_4$ are selected from the group consisting of alkyl, aryl, alkenyl, alkaryl, aralkyl, cycloalkyl, cycloalkenyl, halogen derivatives of the aforesaid and hydrogen. It is preferred that $R_1$ through $R_4$ be selected from the group consisting of $C_1$ through $C_{20}$ alkyl, $C_6$ to $C_{20}$ aryl, $C_2$ to $C_{20}$ alkenyl, $C_7$ to $C_{20}$ alkaryl, $C_7$ to $C_{20}$ aralkyl, $C_3$ to $C_{20}$ cycloalkyl and $C_3$ to $C_{20}$ cycloalkenyl, halogen derivatives thereof, preferably chlorine.

Typical reactants and products which illustrate the preceding reactions are as follows:

TABLE

| Reactants | Products |
|---|---|
| $CH_3CH_2CH_2CH=CHCH_2CH_2CH_3$ + $CH_3CH=CHCH_3$ | $CH_3CH_2CH_2CH=CHCH_3$ |
| $CH_3CH_2CH=CH_2$ + $CH_3CH_2CH_2CH=CHCH_3$ | $CH_3CH=CH_2$ + $CH_3CH_2CH_2CH=CH_2$ + $CH_3CH_2CH=CHCH_3$ + $CH_3CH_2CH_2CH=CHCH_2CH_3$ |
| —$CH=CH_2$ + $CH_3CH=CHCH_3$ | —$CH=CH-CH_3$ + $CH_2=CHCH_3$ |
| —$CH_2CH=CH_2$ + $CH_3CH=CHCH_3$ | —$CH_2CH=CHCH_3$ + $CH_2=CHCH_3$ |
| $CH_3C=CH-CH_2-\underset{CH_3}{\overset{CH_3}{C}}-CH_3$ + $CH_3CH=CHCH_3$ | $CH_3-\underset{CH_3}{\overset{}{C}}=CHCH_3$ + $CH_3CH=CH-CH_3-\underset{CH_3}{\overset{CH_3}{C}}-CH$ |
| $CH_2=CHCH_2CH_2CH=CH_2$ + $CH_3CH_2CH_2CH=CH_2$ | $CH_2=CHCH_2CH_2CH=CHCH_2CH_2CH_3$ + $CH_2=CH_2$ |
| $ClCH_2CH_2CH_2CH=CH_2$ + $CH_3CH=CHCH_3$ | $Cl_2CH_2CH_2CH$ $CH=CHCH_3$ + $CH_2=CHCH_3$ |
| | $CH_2=CHCH_2CH_2CH_2CH_2CH_2CH=CH_2$ |
|  + $CH_2=CH_2$ | |
|  + $CH_3CH=CHCH_2CH_3$ | $CH_3CH=CH-CH_2CH_2CH_2CH=CHCH_2CH_3$ |
|  + $CH_2=CH_2$ | $CH_2=CHCH_2CH_2CH=CH_2$ |
| $CH_2=CHCH_2CH_2CH_2CH_2CH=CH_2$ |  + $CH_2=CH_2$ |
| $CH_2=CHCH_2CH=CHCH_2CH=CH_2$ |  + $CH_2=CH_2$ |
| $CH_2=CHCH_2\underset{}{\overset{CH_3}{C}}H-CH_2CH_2-CH=CHCH_3$ | $CH_3-$ + $CH_2=CHCH_3$ |
|  | $[(CH_2CH=CHCH_2CH_2)_n]$ $n \geq 2$ |
|  | $[(CH_2CH_2CH_2CH_2CH_2CH=CHCH_2CH_2CH_2CH_2)_n]$ $n \geq 2$ |
| $CH_2=CHCH_2CH=CH_2$ |  + $CH_2=CH_2$ |

Reaction conditions in the above reactions are substantially identical to the reaction conditions utilized to form the Group VIB organometallic catalyst of the instant invention. That is to say, the reactants are contacted at temperatures of −35° to +150°C., preferably 0° to 80°C. at pressures which may range from 0.1 and 1000 atm. and preferably 1 and 100 atm. Contact times will vary between 0.1 min. and several days, preferably between 0.2 and 24 hours. The reactants should be contacted in the liquid phase within an inert solvent, preferably an organic inert solvent, or the reacting olefin itself may be employed as solvent. Typical solvents which may be utilized are the $C_1$ to $C_{15}$ alkanes, $C_6$ to $C_{10}$ aryls, halogenated $C_1$ to $C_{10}$ alkanes, $C_6$ to $C_{15}$ haloaryls and certain haloalkenes. Specific examples of solvents include pentane, hexane, decane, benzene, xylene, carbon tetrachloride, methylene chloride, tetrachloroethylene, trichloroethylene, chlorobenzene. A wide range of ratios of reactants to catalysts may be employed. Ratios of reactant to catalyst from 10:1 to 100,000:1 on a molar basis may be used with preferred ratios of from 100:1 to 10,000:1.

SPECIFIC EMBODIMENTS

EXAMPLE 1

Disproportionation of Pentene-1 with a catalyst comprising $M(CO)_6/(n-C_4H_9)_4NCl/(CH_3)_3Al_2Cl_3$ wherein M = Cr, Mo, W In this example, 0.5 millimole each of chromium hexacarbonyl, molybdenum hexacarbonyl and tungsten hexacarbonyl were compared as the metal carbonyl complex of the catalyst. In each case the various metal hexacarbonyl and 0.25 millimole of tetra-n-butylammonium chloride were dissolved in 10 milliliters of chlorobenzene in a nitrogen-filled reaction flask. The reaction vessel consisted of a 100 ml round-bottom flask equipped with nitrogen inlet and a mercury check valve. The reaction mixture was stirred with a magnetic stirrer. Ten ml of pentene-1 followed by 2 ml of a one-molar chlorobenzene solution of methylaluminum sesquichloride were introduced into the vessel. After two hours at ambient temperature and pressure, the reaction mixture was hydrolyzed by the addition of five ml. of methanol and distilled under a vacuum of about 2 mm Hg. into a receiver cooled with liquid nitrogen. Gas chromatographic analysis of the distillate gave the product distribution shown in Table I.

TABLE I

| $M(CO)_6$ | Pentene, Wt.% | Octene, Wt.% | Disprop., % | Isomerization % |
|---|---|---|---|---|
| $Cr(CO)_6$ | 95.8 | 4.2 | 5.2 | 0.0 |
| $Mo(CO)_6$ | 33.2 | 66.8 | 71.5 | 0.3 |
| $W(CO)_6$ | 96.7 | 3.3 | 4.1 | 0.2 |

In identical reactions without the tetra-n-butylammonium chloride present, none of the metal carbonyls showed any disproportionation activity. The above table, Table I, indicates that the tetra-n-butylammonium chloride is useful as a promoter for the disproportionation reaction. It was also observed that the $Mo(CO)_6$ is far superior as an agent for disproportionation, achieving a disproportionation percentage of 71.5.

EXAMPLE 2

Disproportionation of Pentene-1 with $Mo(CO)_6/(CH_3)_3Al_2Cl_3$ and Various Ionic Halides as Component B The identical procedure to Example 1 was utilized in this example, except that the ionic halide, used as Component B, was varied. The several components which were utilized as Component B are included in Table II below. The results of the reactions after one hour at ambient temperature are shown below.

TABLE II

| Component B | Pentene, Wt. % | Octene, Wt. % | Disprop. % |
|---|---|---|---|
| $(n-C_3H_7)_4NCl$ | 59.7 | 40.3 | 45.9 |
| $(n-C_4H_9)_4PCl$* | 97.8 | 2.2 | 2.7 |
| $(C_6H_5)_4AsClxH_2O$ | 91.8 | 8.2 | 10.1 |

*Reaction time was 2 hours

No isomerization of pentene-1 to pentene-2 is observed.

From Table II it is seen that $(n-C_3H_7)_4NCl$ was more effective with a 1-hour reaction period than the other reactants. It should be noted, however, that $(C_6H_5)_4AsClxH_2O$ was effective after 1 hour. From Examples 1 and 2 it can be seen that tetraalkylammonium chlorides are the ionic compounds most effective as a component in the catalyst.

EXAMPLE 3

In this example the disproportionation of pentene-1 with the catalyst system $LMo(CO)_5/(n-C_4H_9)_4NCl/(CH_3)_3Al_2Cl_3$ was effected. L was varied in a manner indicated below. The reactions were conducted for a period of one hour under conditions identical to those designated in Example 1. The results are included hereinbelow in Table III.

TABLE III

| $LMo(CO)_5$ | Pentene Wt.% | Octene Wt.% | Disprop. % | Isomer. % |
|---|---|---|---|---|
| $C_5H_5NMo(CO)_5$ | 37.7 | 62.3 | 67.4 | 0.3 |
| $C_6H_{11}NH_2Mo(CO)_5$ | 45.9 | 54.1 | 59.5 | 0.7 |
| $NH_3Mo(CO)_5$* | 66.3 | 33.7 | 38.9 | 0.3 |
| $CH_3CNMo(CO)_5$ | 53.7 | 46.3 | 52.2 | 1.2 |

*$(n-C_3H_7)_4NCl$ was used as Component B.

Table III indicates that $C_5H_5NMo(CO)_5$ produced the most effective results, i.e., a disproportionation percentage of 67.4.

EXAMPLE 4

Disproportionation of Pentene-1 with $(C_5H_5N)_2Mo(CO)_4/(n-C_4H_9)_4NCl/(CH_3)_2Al_2Cl_4$ 0.5 millimole of $(C_5H_5N)_2Mo(CO)_4$, 0.25 millimole of $(n-C_4H_9)_4NCl$, 2 millimoles of methylaluminum dichloride and 10 ml. pentene-1 in 12 ml. of chlorobenzene were reacted as in Example 1 for 1 hour at ambient temperature. The distillate obtained after hydrolysis of the reaction mixture showed 69.6 percent disproportionation and the presence of 35.4 wt. percent pentene and 64.6 wt. percent octene, as determined by gas chromatography.

EXAMPLE 5

In this example, a reaction identical to Example 4 was performed, except that methylaluminum sesquichloride, in the amount of four millimoles, was used instead of methylaluminum dichloride. At the end of 1½ hours, a yield was obtained comprising 19.2 wt. percent pentene-1 and 80.8 wt. percent octene, indicating an 84.1 percent disproportionation. In the identical experiment without tetra-n-butylammonium chloride, after 2 hours only 7.6 percent disproportionation was observed.

EXAMPLE 6

Disproportionation of Pentene-1 with Molybdenumtetracarbonyl and -Tricarbonyl Complexes In this example, 0.5 mM of various molybdenum tetracarbonyl or -tricarbonyl complexes were reacted as in Example 1 with 0.25 millimole $(n-C_4H_9)_4NCl$, 2 ml of a one-molar chlorobenzene solution of methylaluminum sesquichloride and 10 ml of pentene-1 in 10 ml of chlorobenzene. The reaction time was from one to five hours. The results are shown in Table IV below.

TABLE IV

| Carbonyl Complex | Pentene Wt.% | Octene Wt.% | Disprop. % | Reaction Time (h) |
|---|---|---|---|---|
| $[(C_6H_5)_3P]_2Mo(CO)_4$ | 69.5 | 30.5 | 35.4 | 2 |
| 2,2'-dipyridyl Mo(CO)$_4$ | 56.3 | 43.7 | 49.3 | 1½ |
| diacetyl dihydrazone Mo(CO)$_4$ | 19.3 | 80.7 | 84.0 | 1¼ |
| diacetyl dianil Mo(CO)$_4$* | 90.1 | 9.9 | 12.1 | 5 |
| diacetyl dihydrazone-Mo(CO)$_3$P(C$_6$H$_5$)$_3$ | 69.8 | 30.2 | 35.2 | 1 |
| (C$_5$H$_5$N)$_3$Mo(CO)$_3$ | 33.2 | 66.8 | 71.5 | 1 |
| diglyme Mo(CO)$_3$ | 47.7 | 52.3 | 57.8 | 1 |
| (ethylenediamine)$_3$-Mo$_2$(CO)$_6$** | 34.4 | 65.6 | 73.1 | 1 |

*0.5 millimole of (n-C$_4$H$_9$)$_4$NCl used.
**0.25 millimole of complex and 0.5 millimole (n-C$_4$H$_9$)$_4$NCl used.

From the above it is seen that the most desirable carbonyl complexes were $(C_5H_5N)_3Mo(CO)_3$, (ethylenediamine)$_3$Mo$_2$(CO)$_6$ and diacetyl dihydrozone Mo(CO)$_4$ which give the highest percentages of disproportionation, namely 71.5, 73.1 and 84.0, respectively.

EXAMPLE 7

Disproportionation of 3-methyl butene-1 with $(C_5H_5N)_2Mo(CO)_4/(n-C_4H_9)_4 NCl/(CH_3)_3Al_2Cl_3$ In a manner identical to Example 1, except as indicated, 0.5 millimole of (pyridine)$_2$Mo(CO)$_4$, 0.25 millimole of tetra-n-butylammonium chloride, 4 millimoles methylaluminum sesquichloride and 11 ml of 3-methylbutene-1 in 12 ml of chlorobenzene were reacted for two hours at ambient temperature. The product was then hydrolyzed and recovered by distillation. Gas chromatographic analysis indicated a product composition of 93.7 wt. percent of 3-methylbutene-1 and 6.3 wt. percent of 2,5-dimethylhexene-3 for a 9.2 percent disproportionation.

EXAMPLE 8

Disproportionation of 4-phenylbutene-1

In a manner identical to Example 7, 26.4 grams of 4-phenylbutene-1 was reacted with 0.5 mM (pyridine)$_2$-Mo(CO)$_4$, 0.25 mM of tetra-n-butylammonium chloride and 4 mM of methylaluminum sesquichloride in 12 ml chlorobenzene for 1½ hours. Hydrolysis and separation of the reaction products by distillation resulted in the recovery of 8.0 grams of 4-phenylbutene-1 and 12.6 grams of 1,6-diphenylhexene-3, or 54 percent disproportionation.

EXAMPLE 9

Disproportionation of hexene-2.

Utilizing the same catalyst and conditions as in Example 7, except as otherwise indicated, 10 ml of hexene-2 were contacted with the catalyst for 1 hour at 80°C. The resulting product was determined by gas chromatography, after hydrolysis, to comprise 52.7 wt. percent hexene-2 and 47.3 wt. percent octene-4. Butene-2 is removed from the solution and may be collected by condensation in a trap cooled with dry ice.

EXAMPLE 10

Disproportionation of Octadiene-1.7 with $(C_5H_5N)_2Mo(CO)_4/(n-C_3H_7)_4NCl/(CH_3)_3Al_2Cl_3$ In this example, 0.5 millimole of (pyridine)$_2$Mo(CO)$_4$, 0.25 millimole of (n-C$_3$H$_7$)$_4$NCl, 4 millimoles of methylaluminum sesquichloride and 10 ml octadiene-1,7 in 10 ml chlorobenzene were reacted in a manner identical to Example 1, except as indicated, for 1 hour at ambient temperature. The liquid reaction product as determined by G.C. of the distillate consists exclusively of cyclohexene, indicating a 100 percent conversion.

EXAMPLE 11

Disproportionation of Cis-decene-5 and ethylene

In this example, 1.0 millimole of (pyridine)$_2$Mo(CO)$_4$, 0.5 millimole of (n-C$_4$H$_9$)$_4$NCl and 8 millimoles methylaluminum sesquichloride were added to 38 ml of cis-decene-5 in 55 ml of chlorobenzene. The mixture was reacted under 800 psi of ethylene pressure in a 300 ml stainless steel autoclave for 3 hours. The resulting reaction product, which was recovered as in Example 1 by hydrolysis of the reaction mixture and distillation, was determined by gas chromatography to be 94.0 wt. percent decene-5 and 6.0 wt. percent hexene-1, indicating 5.1 percent disproportionation.

EXAMPLE 12

Disproportionation of Pentene-1 with Mo(CO)$_6$/(n-C$_4$H$_9$)$_4$NCl/(CH$_3$)$_3$Al$_2$Cl$_3$ on Al$_2$O$_3$ 5.0 grams of chromatographic grade, activated alumina, having an 80 to 200 mesh, were impregnated with a solution of 2.0 millimoles of Mo(CO)$_6$ and 1.0 millimole of (n-C$_4$H$_9$)$_4$NCl in 100 ml of chlorobenzene. The solvent, chlorobenzene, was removed at ambient temperature by means of reduced pressure which was about 2 mm Hg. Then 20 ml of pentene-1, 20 ml of chlorobenzene and 8 millimoles of methylaluminum sesquichloride were added using the same procedure as in Example 1. After 2 hours of reacting at ambient temperature, the reaction product recovered as in Example 1, consisted of 60.2 wt. percent pentene and 29.8 wt. percent of octene was determined by G.C. for 45.2 percent disporportionation.

EXAMPLE 13

Disproportionation of Cyclopentene

In the same manner as in Example 1, except as otherwise indicated, 0.5 mM (pyridine)$_2$Mo(CO)$_4$, 0.5 mM (n—C$_4$H$_9$)$_4$NCl, 50 ml of cyclopentene and 4 mM methylaluminum sesquichloride in 50 ml of chlorobenzene are reacted at ambient temperature for 5 hours. The resulting viscous solution is poured into two liters of methanol; about 6 grams of a rubber-like polymer are obtained.

What is claimed is:

1. A process for the disproportionation of olefins which comprises contacting a feedstream containing at least one olefin capable of being disporportionated with a catalyst which is prepared by contacting within a solvent, a metallic complex having the formula L$_a$M$_b$(CO)$_c$ wherein L is selected from the group consisting of CO, R$_3$Q, R$_3$QO, (RO)$_3$Q, RNH$_2$, R$_2$NH, RCN, R$_2$SO, R$_2$N—CN, R$_3$P=N—CN, R$_3$P=NH, R$_3$P=CH—CH$_3$, R$_2$Q—QR$_2$, R$_2$Q—R$_2$—QR$_2$, R$_2$Q—R$^2$—QR$_2$, R—Z—R$^2$—Z—R, R—Z—R$^2$—Z—R$^2$—Z—R.

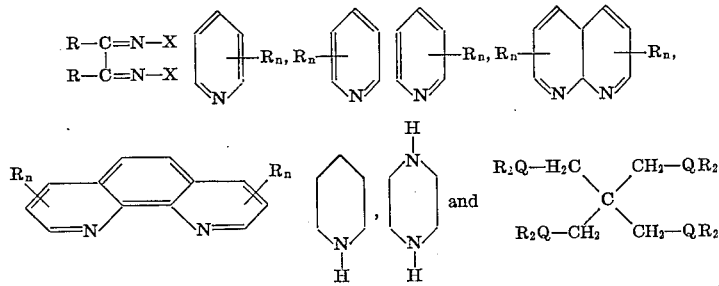

wherein Q is selected from the group consisting of N, P, As and Sb; Z is selected from the group consisting of O and S; X is selected from the group consisting of NR$_2$, OH, OR and R; R is selected from the group consisting of C$_1$ to C$_{20}$ hydrocarbyl and hydrogen radicals; and R$^2$ is selected from the group consisting of divalent C$_1$ to C$_{20}$ hydrocarbyl radicals; n is an integer of from 0 to 2; M is a Group VI-B metal selected from the group consisting of Cr, Mo and W; $a$ may vary from 1 to 4; $b$ may vary from 1 to 2; and $c$ may vary from 2 to 10, with an ionic compound, said ionic compound being selected from the group consisting of compounds having the general formula R'$_4$Q'X', R'$_3$ZX', (R'$_4$Q')(AlR'$_d$X'$_{4-d}$), (R'$_3$Z)(AlR'$_d$X'$_{4-d}$), mixtures of R'$_4$Q'X' or R'$_3$ZX' with AlR'$_d$X'$_{3-d}$ and mixtures thereof wherein R' is selected from the group consisting of C$_1$ to C$_{20}$ hydrocarbyl radicals and halogenated derivatives thereof, Q' is selected from the group consisting of nitrogen, phosphorous and arsenic, Z is selected from the group consisting of oxygen and sulfur, X' is halogen and $d$ may vary from 0 to 3, and said ionic compound being at least partially soluble in said solvent and an activator, said activator comprising an organometallic derivative selected from the group consisting of compounds having the general formula R'''$_e$AlX'$_{(3-e)}$, a mixture of the above compound with a compound having the general formula AlX'$_3$, a compound of the general formula R''$_f$M<$^{r'}$$_g$, a mixture of one of several compounds having a formula R''$_f$M'X'$_g$ with one of the various compounds having the formula R''$_e$AlX'$_{(3-e)}$$_3$) and AlX'$_3$ wherein R'' is selected from the group consisting of C$_1$—C$_{20}$ hydrocarbyl radicals and the alkoxy and halo derivatives thereof, M' is a metal selected from the Groups I through III of the Periodic Table of Elements, X' is halogen, $e$ is equal to 1 or 2, $f$ is an integer between 1 and 3, and $g$ is 0, 1 or 2, under disproportionation conditions and recovering of at least one disproportionated product.

2. The process of claim 1 wherein said contacting takes place in the presence of a solvent or excess olefin.

3. The process of claim 1 wherein said disproportionation is a homo disproportionation.

4. The process of claim 3 wherein said olefin is pentene-1.

5. The process of claim 3 wherein said olefin is 3-methylbutene-1.

6. The process of claim 3 wherein said olefin is 4-phenylbutene-1.

7. The process of claim 3 wherein said olefin is hexene-2.

8. The process of claim 3 wherein said olefin is 1,7-octadiene.

9. The process of claim 3 wherein said olefin which is disproportionated has the formula R$_1$(R$_2$)C=CR$_3$(R$_4$) wherein R$_1$, R$_2$, R$_3$, and R$_4$ are independently selected from the group consisting of C$_1$ to C$_{40}$ alkyl, C$_6$ to C$_{20}$ aryl, C$_2$ to C$_{30}$ alkenyl, C$_7$ to C$_{20}$ alkaryl, C$_7$ to C$_{20}$ aralkyl, C$_3$ to C$_{20}$ cycloalkyl, C$_3$ to C$_{20}$ cycloalkenyl radicals and halogenated derivatives thereof wherein said halogen is more than two carbons removed from a double bond and at least one of R$_1$, R$_2$, R$_3$, and R$_4$ is a C$_6$ to C$_{20}$ aryl radical or an R'-CH$_2$ radical wherein R' is selected from the group consisting of C$_1$ to C$_{40}$ alkyl, C$_6$ to C$_{20}$ aryl, C$_2$ to C$_{20}$ alkenyl, C$_7$ to C$_{20}$ alkaryl, C$_3$ to C$_{20}$ aralkyl, C$_3$ to C$_{20}$ cycloalkenyl radicals.

10. The process of claim 9 wherein the temperature is 0° to 80°C., the pressure is 1 to 100 atmospheres and the contact time is 0.2 to 24 hours.

11. The process of claim 9 wherein a mixture of two olefins is cross disproportionated.

12. The process of claim 11 wherein said mixture comprises cis-decene-1 and ethylene.

13. The process of claim 9 wherein a mixture of acyclic mono or polyolefins and a cyclic mono or polyolefin is contacted to form a new acyclic polyolefin.

14. The process of claim 9 wherein one or more cyclic mono or polyolefin is contacted to form a cyclic polyene.

15. The process of claim 9 wherein one or more acyclic polyolefins are contacted to form cyclic or acyclic mono or polyolefins.

* * * * *